(12) United States Patent
Gao

(10) Patent No.: US 8,719,637 B2
(45) Date of Patent: May 6, 2014

(54) SYSTEM AND METHOD FOR ACQUIRING BASIC INPUT/OUTPUT SYSTEM DEBUG CODES

(75) Inventor: Zheng-Xin Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/406,543

(22) Filed: Feb. 28, 2012

(65) Prior Publication Data
US 2013/0159770 A1 Jun. 20, 2013

(30) Foreign Application Priority Data
Dec. 20, 2011 (CN) .......................... 2011 1 0429284

(51) Int. Cl.
G06F 11/00 (2006.01)
(52) U.S. Cl.
USPC .......................................................... 714/36

(58) Field of Classification Search
USPC ....................................................... 714/27, 36
See application file for complete search history.

(56) References Cited

U.S. PATENT DOCUMENTS

| 2008/0313312 | A1* | 12/2008 | Flynn et al. | 709/221 |
|---|---|---|---|---|
| 2011/0276829 | A1* | 11/2011 | Peng et al. | 714/30 |
| 2012/0079259 | A1* | 3/2012 | Swanson et al. | 713/2 |

* cited by examiner

Primary Examiner — Yair Leibovich
(74) Attorney, Agent, or Firm — Novak Druce Connolly Bove + Quigg LLP

(57) ABSTRACT

A system is used for acquiring Basic Input/Output System (BIOS) debug codes. The system includes a platform controller hub (PCH), a storage chip, and a baseboard management controller (BMC). The PCH reads power-on self tests (POST) codes from an address port of a bus, and converts the POST codes to binary data and stores the binary data in the storage chip. The BMC reads the binary data stored in the storage chip and defines the binary data as virtual sensor data, which conform with threshold type data, and decodes the virtual sensor data to POST codes and controls a display unit to display the POST codes.

2 Claims, 2 Drawing Sheets

SYSTEM AND METHOD FOR ACQUIRING BASIC INPUT/OUTPUT SYSTEM DEBUG CODES

BACKGROUND

1. Technical Field

The present disclosure relates to a system and a method capable of acquiring and displaying debug codes of a Basic Input/Output System (BIOS).

2. Description of Related Art

Many electronic systems, such as motherboards and interface cards, are provided with BIOS for power-on self tests (POST) and access of default set-up data upon initialization.

Due to the trend of computers toward multitasking operations, the operations associated with BIOS have grown in complexity. In the development stages of a computer system, even before an operating system is loaded, different factors, such as failure of some components, errors in BIOS codes, may result in boot-up failure and hinder development progress.

A method for acquiring debug codes of a BIOS involves connecting a debug card to the motherboard of a computer. However, this way requires at least partial disassembly of the chassis of the computer, and different computers may require different debug cards, which is inconvenient and costly.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present embodiments.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
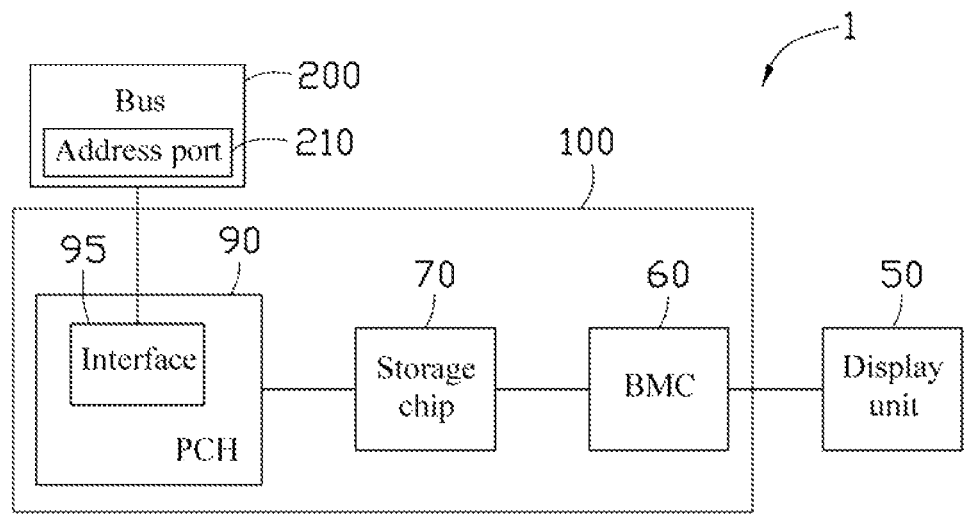
FIG. 1 is a block diagram of a system for acquiring Basic Input/Output System (BIOS) debug codes in accordance with an exemplary embodiment of the present disclosure.

Referring to FIG. 1, a system 100 for acquiring Basic Input/Output System (BIOS) debug codes is arranged on a motherboard of a computer 1. The system 100 in accordance with an exemplary embodiment includes a platform controller hub (PCH) 90 having an interface 95, a storage chip 70, and a baseboard management controller (BMC) 60.

The PCH 90 reads power-on self tests (POST) codes from an address port 210 of a bus 200 in real time, such as the port 80 of the computer 1 through the interface 95, and converts the POST codes to binary data and stores the binary data in the storage chip 70.

The BMC 60 reads the binary data stored in the storage chip 70 and defines the binary data as virtual sensor data, which conforms with threshold type data, and decodes the virtual sensor data to POST codes and controls a display unit 50, such as a display screen of the computer 1, to display the POST codes.

Figure 2:
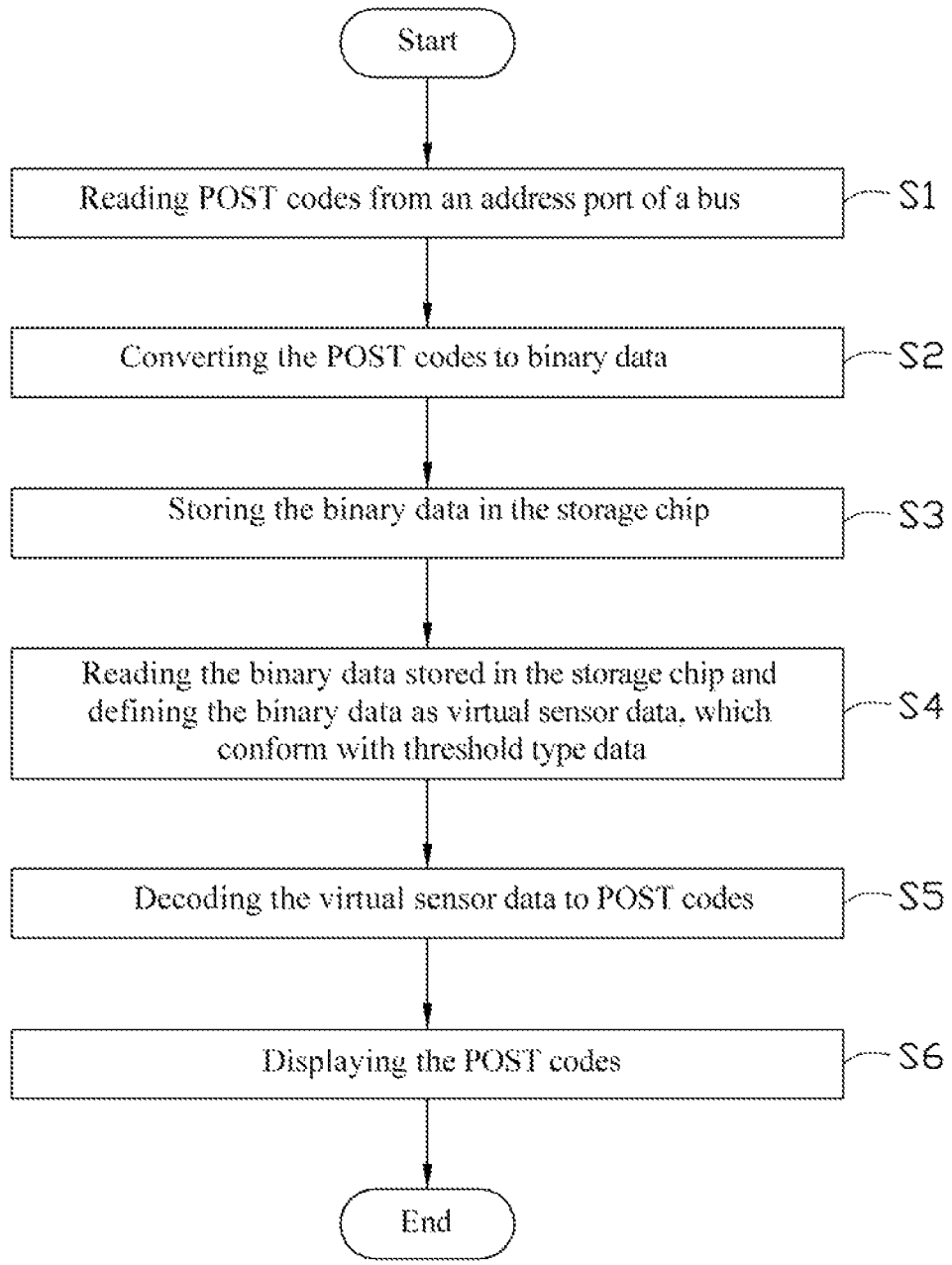
FIG. 2 is a flowchart of a method for acquiring BIOS debug codes in accordance with an exemplary embodiment of the present disclosure.

Referring to FIG. 2, a method for acquiring BIOS debug codes in accordance with an exemplary embodiment of the present disclosure includes the following steps.

Step S1: starting up the motherboard of the computer 1, reading POST codes from an address port of a bus of the computer 1 through the PCH 90.

Step S2: converting the POST codes to binary data through the PCH 90.

Step S3: storing the binary data in the storage chip 70 through the PCH 90.

Step S4: reading the binary data stored in the storage chip 70 and defining the binary data as virtual sensor data, which conform with threshold type data, through the BMC 60.

Step S5: decoding the virtual sensor data to POST codes through the BMC 60.

Step S6: displaying the POST codes through the display unit 50.

The system 100 reads the POST codes from an address port and converts the POST codes to binary data through the PCH 90, and defines the binary data as virtual sensor data and decodes the virtual sensor data to POST codes through the BMC 60, and the BMC 60 controls the display unit 50 to display the POST codes. Therefore, the system 100 can gain POST codes conveniently, without the need to disassemble the computer 1.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A system for acquiring Basic Input/Output System (BIOS) debug codes, comprising:
    a platform controller hub (PCH) with an interface, to read power-on self tests (POST) codes from an address port of a bus of a computer through the interface and convert the POST codes to binary data;
    a storage chip to store the binary data;
    a baseboard management controller (BMC) to read the binary data stored in the storage chip and define the binary data as virtual sensor data, which conform with threshold type data, and decode the virtual sensor data to POST codes; and
    a display unit controlled by the BMC to display the POST codes.

2. A method for acquiring Basic Input/Output System (BIOS) debug codes, comprising:
    starting up a computer, and reading power-on self tests (POST) codes from an address port of a bus of the computer through a platform controller hub (PCH);
    converting the POST codes to binary data through the PCH;
    storing the binary data in a storage chip through the PCH;
    reading the binary data stored in the storage chip and defining the binary data as virtual sensor data, which conforms with threshold type data, through a baseboard management controller (BMC);
    decoding the virtual sensor data to POST codes through the BMC; and
    displaying the POST codes through a display unit.

* * * * *